United States Patent
Urasawa (10) Patent No.: US 6,482,125 B2
(45) Date of Patent: Nov. 19, 2002

(54) UPSHIFT SHOCK REDUCING APPARATUS FOR AUTOMATIC TRANSMISSION

(75) Inventor: Toru Urasawa, Isehara (JP)

(73) Assignee: Nissan Motor Co., Ltd., Kanagawa (JP)

(*) Notice: Subject to any disclaimer, the term of this patent is extended or adjusted under 35 U.S.C. 154(b) by 0 days.

(21) Appl. No.: 09/793,974

(22) Filed: Feb. 28, 2001

(65) Prior Publication Data

US 2001/0021682 A1 Sep. 13, 2001

(30) Foreign Application Priority Data

Mar. 7, 2000 (JP) .................................... 2000-061621

(51) Int. Cl.$^7$ ............................................. F16H 59/14
(52) U.S. Cl. ...................... 477/107; 477/101; 477/102
(58) Field of Search ................................ 477/107, 101, 477/102, 143

(56) References Cited

U.S. PATENT DOCUMENTS

| | | | | |
|---|---|---|---|---|
| 5,188,005 A | * | 2/1993 | Sankpal et al. ............ | 192/109 F |
| 5,779,594 A | * | 7/1998 | Minowa et al. .............. | 422/197 |
| 5,816,976 A | * | 10/1998 | Kuroiwa et al. ............. | 477/101 |
| 5,822,708 A | * | 10/1998 | Wagner et al. ............... | 477/109 |
| 5,839,987 A | * | 11/1998 | Sawamura et al. .......... | 477/107 |
| 6,094,613 A | * | 7/2000 | Ochi et al. .................... | 477/34 |
| 6,223,106 B1 | * | 4/2001 | Yano et al. ................... | 180/165 |

FOREIGN PATENT DOCUMENTS

JP  3-129165 A  6/1994

* cited by examiner

Primary Examiner—Rodney H. Bonck
Assistant Examiner—Eric M. Williams
(74) Attorney, Agent, or Firm—Shinjyu Global IP Counselors, LLP.

(57) ABSTRACT

An upshift shock reducing apparatus is provided to reduce upshift shock in a vehicle having a power train with a power source and an automatic transmission. The upshift shock reducing apparatus has a power source sensor that produces a signal indicative of a power source load, and a controller operatively coupled to the power source sensor, the power source, and the automatic transmission. The controller increases torque from the power source during the torque phase for a first predetermined period until the torque reaches a second predetermined torque, and decreases torque from the power source by a first predetermined torque at an end of a second predetermined period. The second predetermined period is determined based on the signal from the power source sensor, whereby the decreasing starts before the inertia phase. Therefore, the torque can be decreased before the inertia phase.

31 Claims, 9 Drawing Sheets

TaMAX MAP (Nm)

| Nt | 1-2 | 2-3 | 3-4 | 4-5 |
|---|---|---|---|---|
| 6000 | 219 | 286 | 264 | 281 |
| 5000 | 200 | 262 | 241 | 257 |
| 4000 | 156 | 204 | 189 | 201 |
| 3000 | 125 | 164 | 151 | 161 |
| 2000 | 62 | 82 | 75 | 80 |
| 1000 | 31 | 41 | 38 | 40 |

Fig. 5

Δ t2 MAP

| APS | 1-2 | 2-3 | 3-4 | 4-5 |
|---|---|---|---|---|
| 8/8 | 0.20 | 0.16 | 0.22 | 0.21 |
| 7/8 | 0.25 | 0.20 | 0.28 | 0.26 |
| 6/8 | 0.25 | 0.20 | 0.28 | 0.26 |
| 5/8 | 0.30 | 0.24 | 0.33 | 0.32 |
| 4/8 | 0.30 | 0.24 | 0.33 | 0.32 |
| 3/8 | 0.30 | 0.24 | 0.33 | 0.32 |
| 2/8 | 0.35 | 0.28 | 0.39 | 0.37 |
| 1/8 | 0.35 | 0.28 | 0.39 | 0.37 |

Fig. 6

Δt3 MAP

| APS | 1-2 | 2-3 | 3-4 | 4-5 |
|---|---|---|---|---|
| 8/8 | 0.30 | 0.26 | 0.32 | 0.31 |
| 7/8 | 0.35 | 0.30 | 0.38 | 0.36 |
| 6/8 | 0.35 | 0.30 | 0.38 | 0.36 |
| 5/8 | 0.40 | 0.34 | 0.43 | 0.42 |
| 4/8 | 0.40 | 0.34 | 0.43 | 0.42 |
| 3/8 | 0.40 | 0.34 | 0.43 | 0.42 |
| 2/8 | 0.45 | 0.38 | 0.49 | 0.47 |
| 1/8 | 0.45 | 0.38 | 0.49 | 0.47 |

UPSHIFT SHOCK REDUCING APPARATUS FOR AUTOMATIC TRANSMISSION

BACKGROUND OF THE INVENTION

1. Field of the Invention

This invention generally relates to an apparatus for reducing upshift shock in a vehicle with an automatic transmission. More specifically, the present invention relates to an apparatus for reducing upshift shock caused by torque retraction that occurs during a torque phase of an upshift operation of an automatic transmission.

2. Background Information

Generally, an automatic transmission has a plurality of frictional elements such as clutches or brakes, which are selectively hydraulically operated to establish a plurality of speed ratios or gear positions within a multi-ratio automatic transmission. More specifically, the transmission can be shifted to different gears by changing the frictional elements that are engaged.

When the automatic transmission shifts from a lower gear to a higher gear (hereinafter referred to as upshift), a torque retraction phenomenon usually occurs. During the torque retraction phenomenon, which occurs as the transmission is upshifted, an output torque first decreases sharply, and then increases sharply before the output torque is eventually adjusted from the initial torque before the upshift operation to the new torque after the upshift operation. The phase in which the output torque decreases sharply is called a torque phase, while the phase in which the output torque increases sharply and eventually becomes adjusted to the new torque after the upshift operation is called an inertia phase. In particular, an effective gear ratio, which is the ratio of the input rotation to the output rotation of the transmission, changes during the inertia phase.

During the torque phase, which occurs immediately preceding the inertia phase, the output torque decreases sharply, as described above. Accordingly, this torque retraction phenomenon causes an upshift shock accompanied by a sensation of vehicle deceleration. Since this torque retraction phenomenon is well known in the art, details of the torque retraction phenomenon, the torque phase and the inertial phase would be obvious to one of ordinary skill in the art without further explanation herein.

As indicated in Laid-Open Japanese Patent Publication No. 3-129165, the upshift shock due to the torque retraction phenomenon has been conventionally mitigated by temporarily increasing the input torque from the power source (hereinafter called torque up operation) during the torque phase of the upshift operation of the automatic transmission, thereby canceling out the reduction in torque due to the torque retraction phenomenon. After this torque up operation, the input torque of the power source is decreased (hereinafter called torque down operation), in order to cancel out the sharp increase in torque during the inertial phase.

The torque down operation has to be conducted before the inertia phase of the torque retraction phenomenon starts. However, with such conventional methods, there is no guarantee that the aforementioned torque down operation will start before the inertia phase starts. Specifically, the inertia phase starts at different timings depending on the load conditions of the power source and the gear upshift selection, i.e., which gear the transmission is being upshifted to. Therefore, there is always a risk that the torque down operation will not be initiated until after the inertia phase has already started.

If the torque down operation is conducted after the inertia phase has already begun, this means that the inertia phase starts while the torque up operation is still in effect. In other words, at the beginning of the torque phase, the input torque from the power source has been increased to cancel out the effect of the torque reduction from the torque retraction phenomenon. Accordingly, the input torque has not been decreased at the beginning of the inertia phase. Consequently, it will not be possible to prevent the occurrence of an upshift shock that occurs at the beginning of the inertia phase. Furthermore, depending on the size of the torque, it is also possible that the inertia phase may not even start until the torque down operation is completed.

In view of the above, there exists a need for an upshift shock reducing apparatus which overcomes the above mentioned problems in the prior art. This invention addresses this need in the prior art as well as other needs, which will become apparent to those skilled in the art from this disclosure.

SUMMARY OF THE INVENTION

The object of the present invention is to provide an upshift shock reduction apparatus that consistently starts the torque down operation before the inertia phase starts to ensure reduction of shock during the upshift operation.

The aforementioned object can be attained by providing an upshift shock reducing apparatus for a vehicle having a power train that includes a power source and an automatic transmission having a plurality of shift gears. The upshift shock reducing apparatus comprises a power source sensor that produces a signal indicative of a power source load of the power source, and a controller operatively coupled to the power source sensor, the power source, and the automatic transmission. The controller is configured to increase torque of the power source during a torque phase of an upshift operation for a first predetermined period, and decrease the torque of the power source by a first predetermined torque at an end of a second predetermined period. The second predetermined period is determined based on the signal from the power source sensor, such that the decrease of the torque starts before an inertia phase of the upshift operation.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

Figure 1:
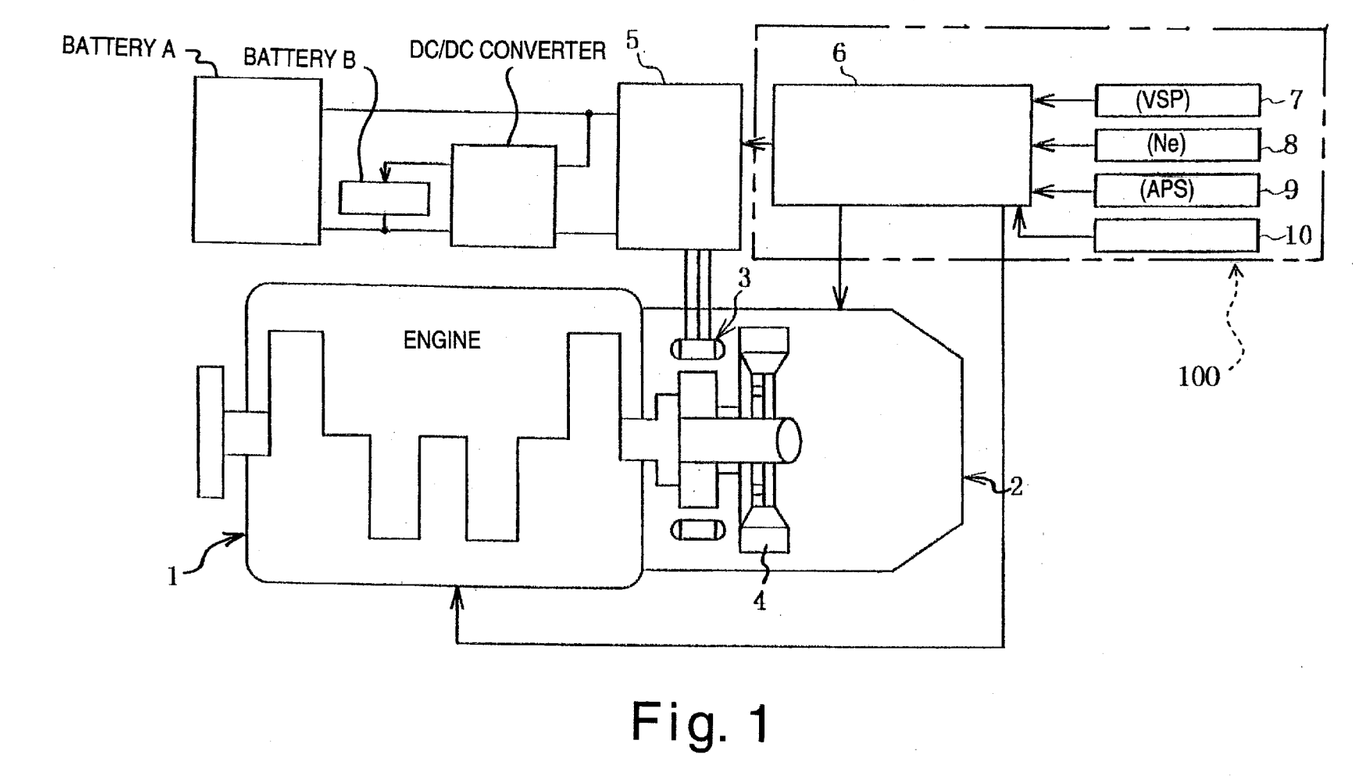
FIG. 1 is a simplified block diagram of a power train for a vehicle equipped with an upshift shock reducing apparatus for an automatic transmission in accordance with selected embodiments of the present invention.

Referring initially to FIG. 1, a power train of a vehicle equipped with an upshift shock reducing apparatus 100 is schematically illustrated as a block diagram to explain a first embodiment of the present invention. The power train basically includes a power source having an engine 1 and a motor/generator 3, an automatic transmission 2, and a torque converter 4. The motor/generator 3 preferably has an inverter 5 that is operatively connected to batteries A and B and an DC/DC convertor. Upshift shock reducing apparatus 100 basically includes a controller 6, a vehicle speed sensor 7, an engine speed sensor 8, a power source or accelerator sensor 9 and a hydraulic pressure switch 10.

Engine 1 automatically comes to an idle stop, when an accelerator pedal (not shown) is released in order to stop the vehicle. Engine 1 automatically increases in rpms, when the accelerator pedal is depressed, thus enabling the vehicle to travel. Automatic transmission 2 is a multi-geared automatic transmission in which a gear is selected through selective hydraulic operation of a plurality of frictional elements such as clutches and brakes. Since engines and automatic transmissions are well known in the art, detailed descriptions of the structures and the functions of engine 1 and automatic transmission 2 are omitted herein.

Motor/generator 3 and torque converter 4 are disposed between engine 1 and automatic transmission 2, with the motor/generator 3 disposed adjacent to the engine 1 and the torque converter 4 adjacent to automatic transmission 2. Motor/generator 3 is preferably a conventional brushless, permanent-magnet, three-phase AC synchronous motor/generator, which includes an inverter 5. When the accelerator pedal is depressed for the purpose of re-accelerating the vehicle, motor/generator 3 starts under the control of inverter 5. The inverter 5 accelerates the vehicle, and starts engine 1. Since motor/generators and torque converters are well known in the art, the structures and the functions of motor/generator 3 and torque converter 4 would be obvious to one of the ordinary skill in the art without further explanation herein.

Controller 6 is operatively coupled to engine 1, automatic transmission 2, and motor/generator 3. In other words, engine 1, automatic transmission 2, and motor/generator 3 are operatively controlled by controller 6. Controller 6 preferably includes a microcomputer, an input detection circuit for receiving various signals, a processor circuit (Central Processing Unit or CPU), a memory circuit, and an output circuit that outputs signals to engine 1, automatic transmission 2, and motor/generator 3. The memory circuit stores processing results and control programs such as ones for upshift operation that are run by the processor circuit. It will be apparent to those skilled in the art from this disclosure that the precise structure and algorithms for controller 6 can be any combination of hardware and software that will carry out the functions of the present invention. In other words, "means plus function" clauses as utilized in the specification and disclosure should include any structure or hardware and/or algorithm or software that can be utilized to carry out the function of the "means plus function" clause.

Controller 6 is further operatively coupled to vehicle speed sensor 7 (vehicle speed sensing means), engine speed sensor 8, accelerator sensor 9 (power source sensing means), and hydraulic pressure switch 10. Input signals are transmitted to controller 6 by these components in order to accomplish its control functions. Such input signals include signals from vehicle speed sensor 7 that are indicative of vehicle speed VSP, signals from engine speed sensor 8 that are indicative of engine speed Ne, signals from accelerator sensor 9 that are indicative of accelerator pedal depression amount APS, and signals from hydraulic pressure switch 10 that are indicative of hydraulic pressure of the frictional elements. More specifically, the signal from hydraulic pressure switch 10 indicates as ON when, during the upshift operation of automatic transmission 2, the working hydraulic pressure of the frictional element has reached a predetermined value at which the torque phase starts. Actual hydraulic pressure at which the torque phase starts varies depending on various driving conditions pertinent to the upshift operation.

Figure 2:
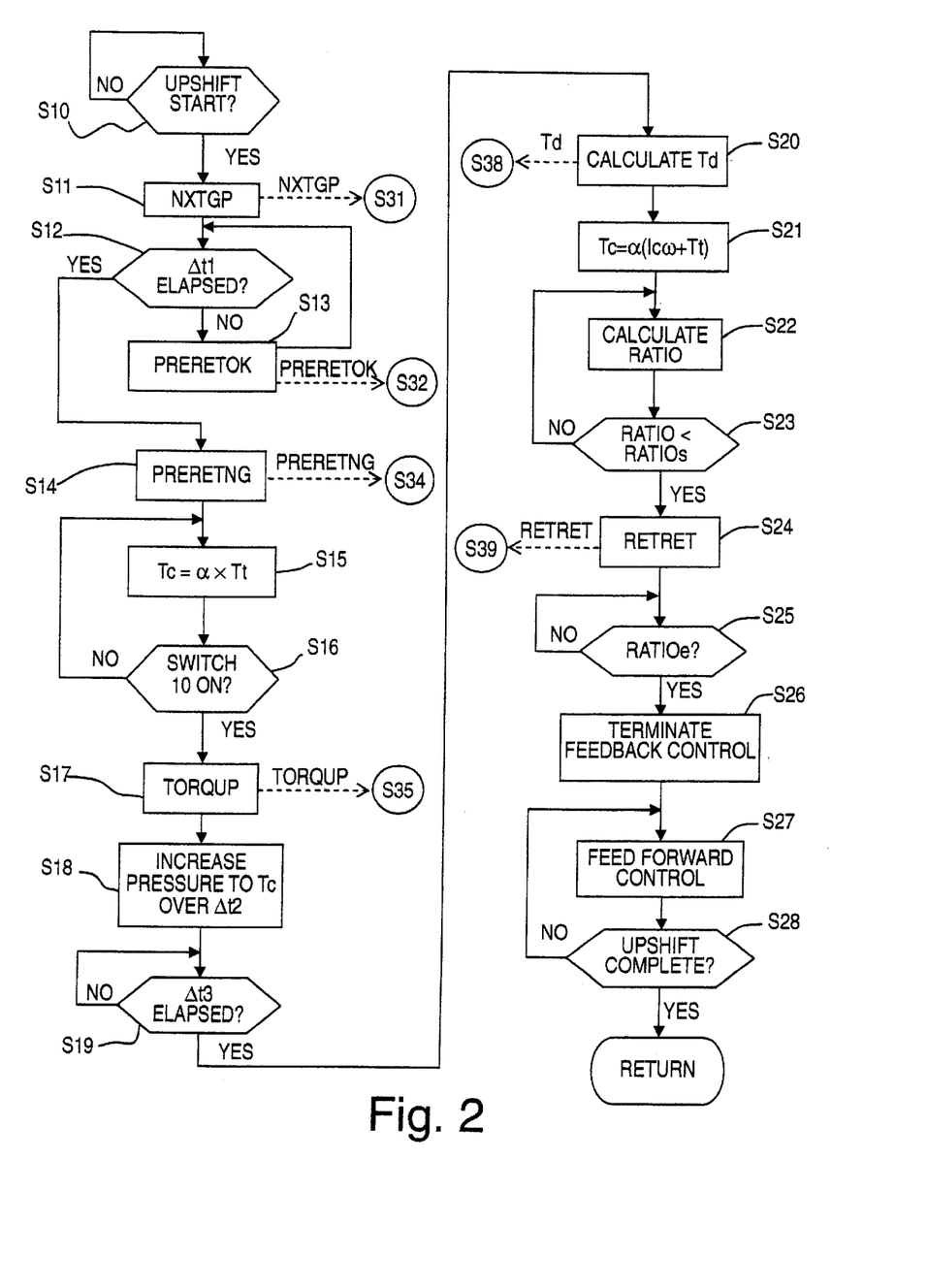
FIG. 2 is a flowchart of an automatic transmission control executed by a controller of the upshift shock reducing apparatus in order to accomplish torque up and torque down operations during the upshift operation of the automatic transmission in accordance with the first embodiment of the present invention.
Figure 3:
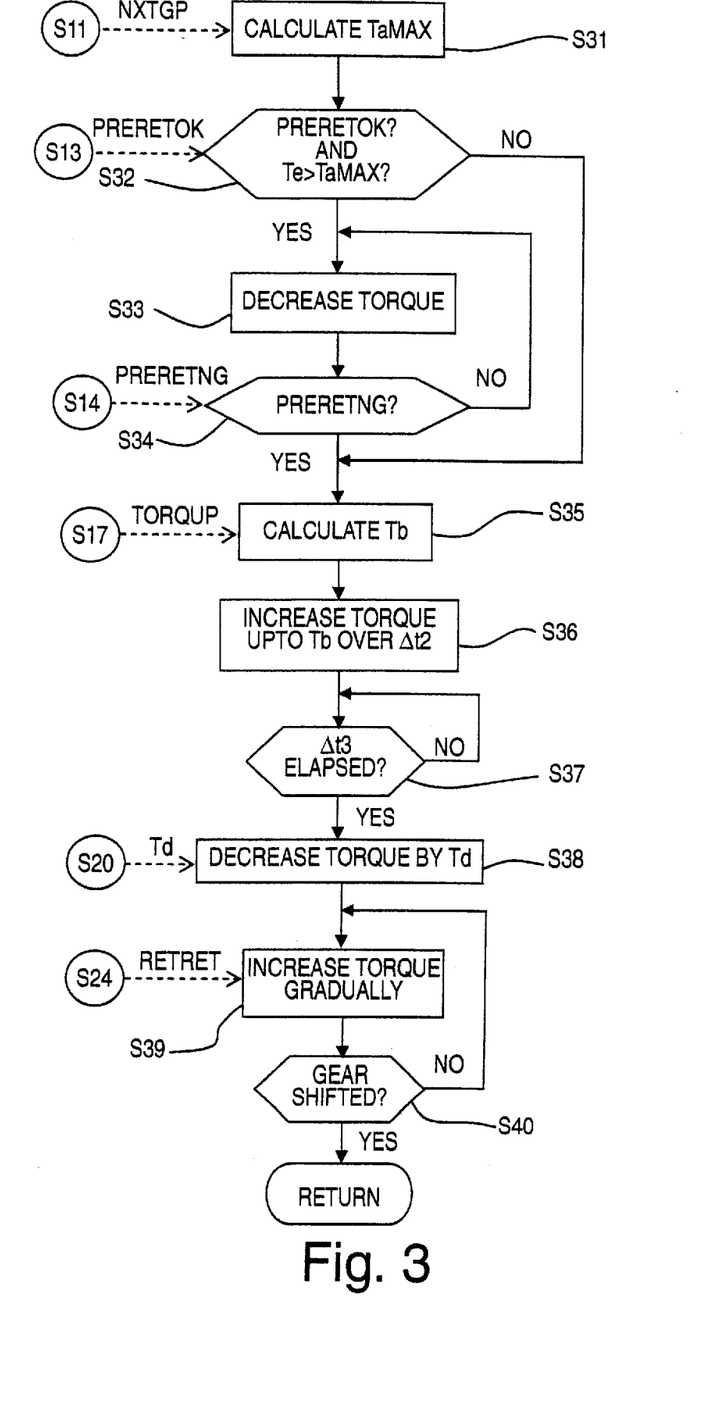
FIG. 3 is a flowchart of an engine control executed by the controller in order to accomplish torque up and torque down operations during the upshift operation of the automatic transmission in accordance with the first embodiment of the present invention.

As shown in FIG. 2, controller 6 controls the upshifting of automatic transmission 2. This operation of controlling the upshifting of automatic transmission 2 by controller 6 is hereinafter referred to as an automatic transmission control. The control of engine 1 during the upshift operation by controller 6, which is shown in FIG. 3, is hereinafter referred to as an engine control.

The automatic transmission control begins when controller 6 determines in step S10 based on the vehicle speed VSP and the accelerator pedal depression amount APS that the vehicle has started an upshift operation. In other words, the automatic transmission control begins when controller 6 determines that the vehicle is shifting from a lower gear to a higher gear. Therefore, controller 6 functions as upshift determining means. This moment of determination is indicated as "t1" in the timing chart shown in FIG. 4. After this determination, the automatic transmission control for the upshifting operation is executed as explained below. Once it is determined that the vehicle has started the upshift operation, controller 6 proceeds to step S11. Otherwise, controller 6 continuously repeats step S10 until an upshift is determined.

In step S11, controller 6 produces a next gear signal NXTGP, which will be utilized in the engine control, which will be discussed later with reference to FIG. 3. Then, controller 6 proceeds to step S12.

In step S12, controller 6 checks if a third predetermined period or a pre-retard permission period $\Delta t1$ has elapsed since it has been determined that the vehicle has started the upshift operation.

The pre-retard permission period $\Delta t1$ is a period during which the engine torque can be reduced before the torque up operation. In other words, the pre-retard permission period $\Delta t1$ occurs immediately before the period in which the engine torque is increased to prevent torque retraction shock during the torque phase of the upshift operation. In this embodiment, the engine torque is reduced during the pre-retard permission period $\Delta t1$ by delaying the ignition timing (a pre-retard operation). Conversely, the engine torque is increased by advancing the ignition timing. The pre-retard permission period $\Delta t1$ is predetermined based on the accelerator pedal depression amount APS and the gear upshift selection. If it is determined in step S12 that the pre-retard permission period $\Delta t1$ has not elapsed, controller 6 proceeds to step S13. Otherwise, controller 6 skips step S13 and proceeds to step S14.

In step S13, controller 6 produces a pre-retard permission signal PRERETOK. The pre-retard permission signal PRERETOK will be utilized in the engine control to execute the pre-retard operation, since the pre-retard permission period $\Delta t1$ has not elapsed.

Once it is determined in step S12 that the pre-retard period $\Delta t1$ has elapsed, controller 6 proceeds to step S14. The moment at which the pre-retard permission period $\Delta t1$ elapses is indicated as "t2" in the timing chart shown in FIG. 4. In step S14, controller 6 produces a pre-retard end signal PRERETNG, which is utilized in the engine control to stop the pre-retard operation. Then, controller 6 proceeds to step S15.

In step S15, controller 6 calculates a torque capacity Tc of the frictional elements that was activated during the upshift operation. The torque capacity Tc is obtained by calculating a product of a multiplying transmission input torque (turbine torque) Tt by a constant $\alpha$, i.e., Tc=$\alpha \times$Tt. The transmission input torque Tt is preferably calculated in a conventional manner based on the engine speed Ne, accelerator pedal depression amount APS, and the amount of time by which the ignition timing is delayed. Then, controller 6 proceeds to step S16.

In step S16, controller 6 determines whether the operating (engaging) hydraulic pressure of the frictional elements has reached a predetermined value, at which time a hydraulic pressure switch 10 will be turned ON. The moment that hydraulic pressure switch 10 is turned ON is the beginning of the torque phase. In other words, as shown in the timing chart of FIG. 4, the torque phase starts at the torque phase start moment t3. As further seen in the timing chart of FIG. 4, the operating hydraulic pressure of the frictional elements begins increasing at t1, when it is determined that the vehicle has started the upshift operation. If controller 6 does not determine that the operating hydraulic pressure of the frictional elements has reached the predetermined value, controller 6 returns to step S15, and continuously repeats steps S15 and S16 until the operating hydraulic pressure of the frictional elements reaches the predetermined value, and hydraulic pressure switch 10 is turned ON. Once hydraulic pressure switch 10 is turned ON, controller 6 proceeds to step S17.

In step S17, controller 6 produces a torque phase torque up request signal TORQUP, which will be utilized in the engine control to cancel out the decrease in torque caused by torque retraction during the torque phase. Then, controller 6 proceeds to step S18.

In step S18, the hydraulic pressure of the frictional elements is increased gradually for a first predetermined period or a set period $\Delta t2$ until the clutch capacity reaches the value Tc calculated in step S15. As shown in the timing chart of FIG. 4, the period during which the hydraulic pressure of the frictional elements is increased until the clutch capacity reaches the value Tc is the set period $\Delta t2$. The duration of the set period $\Delta t2$ is determined based on the accelerator pedal depression amount APS and the gear upshift selection (i.e., 1–2, 2–3, 3–4, or 4–5). In other words, the duration of the set period $\Delta t2$ varies depending upon the accelerator pedal depression amount APS and the gear upshift selection. Thus, the duration of the set period $\Delta t2$ is obtained from a mapping table such as the one shown in FIG. 6.

Accordingly, controller 6 functions as first period determining means and torque increasing means. As shown in the timing chart of FIG. 4, at the time the hydraulic pressure of the frictional elements reaches Tc, the set period $\Delta t2$ ends, and controller 6 is at moment t4. Then, a second predetermined period or a set period $\Delta t3$ starts. Controller 6 proceeds to step S19.

Figure 4:
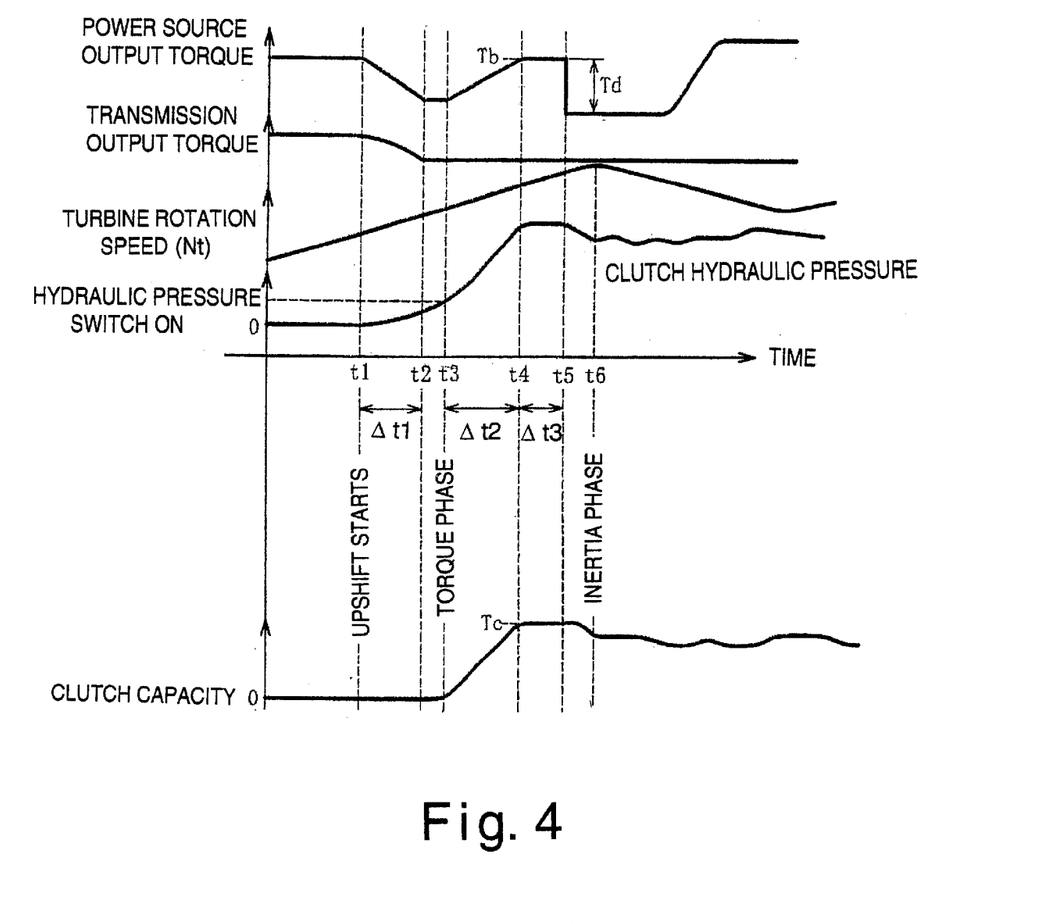
FIG. 4 is an operation timing chart diagrammatically indicating values of various parameters during the upshift operation, particularly during the torque up and torque down operations in accordance with selected embodiments of the present invention.

In step S19, controller 6 checks if the set period $\Delta t3$ has elapsed and a moment t5 has occurred as shown in the timing chart of FIG. 4. The duration of the set period $\Delta t3$ is also determined based on the accelerator pedal depression amount APS and the gear upshift selection (i.e., 1–2, 2–3, 3–4, or 4–5). Thus, the duration of the set period $\Delta t3$ is obtained from a mapping table such as the one shown in FIG. 7. In other words, controller 6 functions as second period determining means. When set period $\Delta t3$ elapses and moment t5 has occurred as shown in FIG. 4, controller 6 proceeds to step S20. Otherwise, controller 6 continuously repeats step S19.

In step S20, controller 6 calculates a second predetermined torque or a requested torque down amount Td, which will be used in the engine control explained below. More specifically, the requested torque down amount Td is used in order to return the engine torque to a value with which an upshift shock does not occur during the inertia phase. Then, controller 6 proceeds to step S21.

In step S21, controller 6 starts a feedback control on the clutch hydraulic pressure as shown in the timing chart of FIG. 4. More specifically, controller 6 controls the clutch hydraulic pressure such that the value obtained by multiplying the sum of an inertia torque Ic$\omega$ and the transmission input torque Tt by a constant $\alpha$ is the clutch capacity Tc, i.e., Tc=$\alpha$(Ic$\omega$+Tt). Then, controller 6 proceeds to step S22.

In step S22, controller 6 calculates a speed ratio RATIO of the torque converter 4 from the engine speed Ne and a turbine rotational speed Nt. The turbine rotational speed Nt is calculated based on the vehicle speed VSP. Then, controller 6 proceeds to step S23.

In step S23, controller 6 determines whether the speed ratio RATIO has decreased to a speed ratio RATIOs. The speed ratio RATIOs is a threshold value for switching the retarded ignition timing to the normal ignition timing. If the speed ratio RATIO has decreased to RATIOs, controller 6 proceeds to step S24. Otherwise, controller 6 continuously repeats step S22.

In step S24, controller 6 produces an ignition timing retard return start signal RETRET, which will be utilized in the engine control to increase the torque gradually as explained below with reference to FIG. 3. Controller 6 proceeds to step S25.

In step S25, controller 6 determines whether the speed ratio RATIO has become a speed ratio RATIOe, which is a threshold value to determine whether the feedback control should be terminated. If the speed ratio RATIO has become the speed ratio RATIOe, controller 6 proceeds to step S26. Otherwise, controller 6 continuously repeats step S25.

In step S26, controller 6 terminates the aforementioned feedback control of the clutch hydraulic pressure. Then, controller 6 proceeds to step S27, where controller 6 starts a feed forward control. Then, controller 6 proceeds to step S28.

In step S28, controller 6 continues the feed forward control until controller 6 determines that the upshift operation has been completed.

Now referring to FIG. 3, the engine control by controller 6 will be explained. The engine control starts upon receiving the next gear signal NXTGP produced in step S11 of the automatic transmission control discussed above with reference to FIG. 2.

Figure 5:
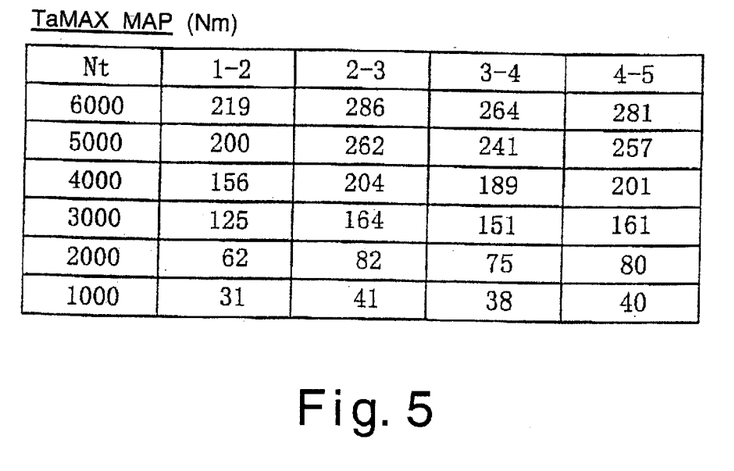
FIG. 5 is a mapping table of values to be utilized in calculation of the maximum value TaMAX, above which pre-torque down operation is required prior to conducting the torque up operation, in accordance with selected embodiments of the present invention.

In step S31, controller 6 calculates a third predetermined torque or a maximum torque TaMAX. If the engine torque Te is above the maximum torque TaMAX, the engine torque needs to be reduced before the torque up operation begins. As mentioned above, the torque up operation increases the engine torque to reduce an upshift shock due to the torque retraction phenomenon that occurs during the torque phase of the upshift operation. The value of this maximum torque TaMAX is selected from predetermined values, such as those exemplified in the mapping table shown in FIG. 5. The value of this maximum torque is determined by a conventional calculation based on the transmission input rotational speed or a turbine rotational speed Nt and the gear upshift selection. Therefore, controller 6 functions as detecting means by detecting the gear upshift selection of the upshift operation. Controller 6 further functions as third predetermined torque determining means, by determining the maximum torque TaMAX based on the turbine rotational speed Nt, which is calculated based on the vehicle speed VSP and the gear upshift selection. Controller 6 proceeds to step S32.

In step S32, controller 6 determines whether the pre-retard permission signal PRERETOK has been produced by controller 6 in step S13 of the automatic transmission control. Also, controller 6 compares the engine torque Te with the maximum torque TaMAX. If the pre-retard permission signal PRERETOK has been produced by controller 6, and if the engine torque Te exceeds the maximum torque TaMAX, controller 6 proceeds to step S33. If either or both of the two conditions being checked in step S32 is not satisfied, then controller 6 skips steps S33 and S34 and proceeds directly to step S35. In other words, if either the pre-retard permission signal PRERETOK has not been produced or the engine torque Te is smaller than the maximum torque TaMAX, then controller 6 skips steps S33 and S34, and proceeds directly to step S35.

In step S33, controller 6 pre-decreases the engine torque by pre-retarding or delaying the ignition of engine 1 to reduce the upshift shock during the torque phase. More specifically, controller 6 gradually decreases the engine torque Te if controller 6 produced the pre-retard permission signal PRERETOK in step S3 of the automatic transmission control, and if the engine torque Te is greater than the maximum torque TaMAX. In other words, controller 6 functions as pre-decreasing means. Then, controller 6 proceeds to step S34.

In step S34, controller 6 checks if controller 6 produced the pre-retard end signal PRERETNG in step S14, i.e., if pre-retard permission period $\Delta t1$ has elapsed and the moment t2 has occurred as shown in the timing chart of FIG. 4. If the pre-retard end signal PRERETNG has been produced, controller 6 proceeds to step S35. Otherwise, controller 6 continuously repeats step S33 until the pre-retard permission period $\Delta t1$ has elapsed and the moment t2 has occurred.

In step S35, in response to the torque phase torque up request signal TORQUP produced in step S17 of the automatic transmission control, controller 6 calculates a second predetermined torque or an engine torque up amount Tb, which is the amount required to cancel the torque retraction phenomenon that occurs during the torque phase. The torque phase torque up request signal TORQUP is produced at the start of the torque phase. The torque phase start moment t3, shown in the timing chart of FIG. 4, indicates the start of the torque phase. Then, controller 6 proceeds to step S36.

In step S36, controller 6 advances the ignition timing of engine 1 so that the engine torque Te increases gradually. As shown in the timing chart of FIG. 4, the engine torque Te increases at a predetermined rate over a first predetermined period or a set period $\Delta t2$ following the torque phase start moment t3, until the engine torque Te reaches the engine torque up amount Tb calculated in step S35.

Figure 6:
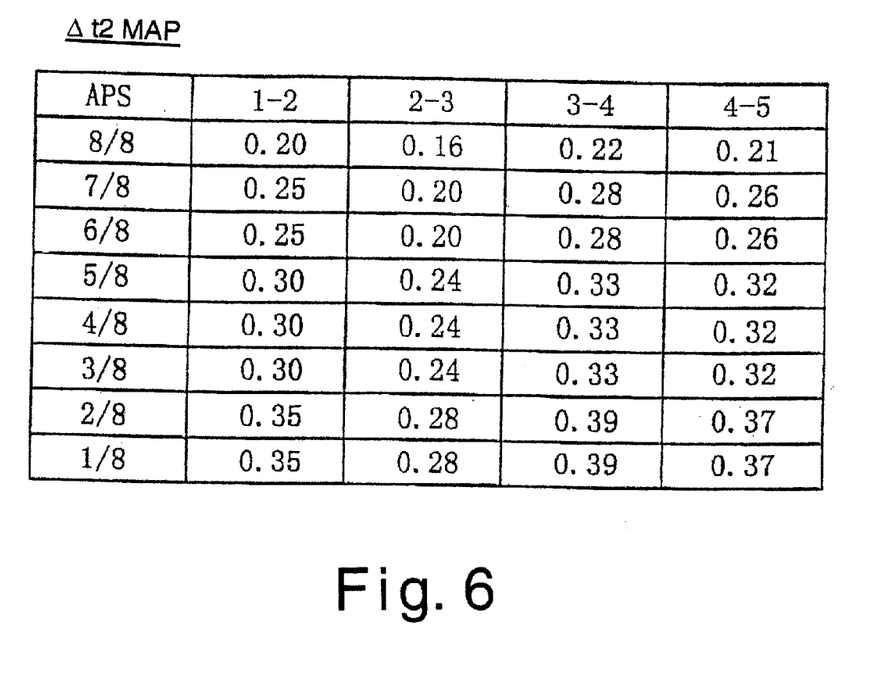
FIG. 6 is a mapping table of values to be utilized in calculation of the set period Δt2, during which the torque up operation is conducted, in accordance with selected embodiments of the present invention.

Here, the set period $\Delta t2$ is obtained from the mapping table shown in FIG. 6, wherein the set period $\Delta t2$ is based on the accelerator pedal depression amount APS and the gear upshift selection (i.e., 1–2, 2–3, 3–4, or 4–5). Therefore, controller 6 functions as detecting means by detecting a gear upshift selection. Also, controller 6 functions as first period determining means by determining the duration of the set period $\Delta t2$ based on the accelerator pedal depression amount APS and the gear upshift selection. Controller 6 also functions as torque increasing means by increasing the engine torque during the torque phase for the set period $\Delta t2$, until the torque reaches the predetermined torque Tb. Then, controller 6 proceeds to step S37.

In step S37, controller 6 checks if a torque down start moment t5 has occurred as shown in the timing chart of FIG. 4. The moment t5 is the end of a second predetermined period or a set period $\Delta t3$, which starts when set period $\Delta t2$ ends or at the moment t4, as shown in the timing chart of FIG. 4. The duration of the set period $\Delta t3$ is also obtained from the mapping table shown in FIG. 7, wherein the set period $\Delta t3$ is based on the accelerator pedal depression amount APS and the gear upshift selection (i.e., 1–2, 2–3, 3–4, or 4–5). In other words, controller 6 functions as second period determining means by determining the duration of the set period $\Delta t3$ based on the accelerator pedal depression amount APS and the gear upshift selection.

During the set period $\Delta t3$, the ignition timing of engine 1 is held constant so that the engine torque Te is held constant between moment t4 and moment t5, as shown in the timing chart of FIG. 4.

When it is determined in step S37 that the moment t5 has occurred as shown in the timing chart of FIG. 4, controller 6 proceeds to step S38. In other words, if the set period $\Delta t3$ has elapsed, then controller 6 proceeds to step S38. Otherwise, controller 6 repeats step S37.

In step S38, controller 6 delays the ignition timing of engine 1, so that the engine torque Te decreases by the requested torque down amount Td calculated in step S20. In other words, controller 6 functions as torque decreasing means by decreasing the torque by the requested torque down amount Td, at the end of the set period Δt3. The torque phase ends at a moment t6, at which time the inertia phase starts as shown in the timing chart in FIG. 4. Therefore, the decreasing of the torque starts before the inertia phase starts. In this manner, an upshift shock during the inertia phase is prevented. Then, controller 6 proceeds to step S39.

In step S39, as the ignition timing retard return start signal RETRET is produced in step S24 of the automatic transmission control, the ignition timing of the engine is increased to its original state at a prescribed rate of torque increase per unit time, so that the engine torque Te increases gradually as shown in the timing chart in FIG. 4. Controller 6 proceeds to step S40.

In step S40, controller 6 determines whether the transmission gear ratio has reached the post-shift gear ratio, or whether the engine torque Te has reached the target torque. If either of these criteria is satisfied, controller 6 ends the gradual increase of the engine torque Te. Also, the engine control ends.

As seen in the timing chart in FIG. 4, by conducting the upshift operation and the torque up and torque down operations as described above, the output torque Te of engine 1 is first increased to Tb by advancing the ignition timing of engine 1, and then decreased by the requested torque down amount Td by delaying the ignition timing of engine 1 during the torque phase of the upshift operation of automatic transmission 2(between moment t3 and moment t6). As a result, the torque retraction shock that occurs during the upshift operation can be reduced.

Figure 7:
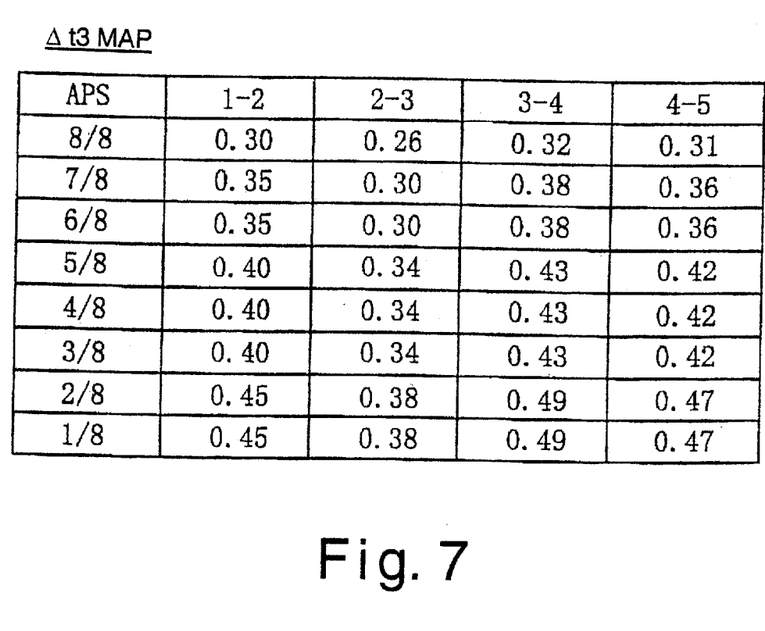
FIG. 7 is a mapping table of values to be utilized in calculation of the set period Δt3, in accordance with selected embodiments of the present invention.

With upshift shock reducing apparatus 100 of the present invention, the torque down start moment t5 is determined from the mapping table shown in FIG. 7. At the torque down start moment t5, the engine torque Te that has temporarily been increased to Tb is decreased. As shown in FIG. 7, Δt3 is determined based on the accelerator pedal depression amount APS. In other words, the torque down start moment t5 is indirectly determined based on the load on engine 1. Therefore, it can be ensured that the reduction of torque starts before the inertia phase starts at the moment t6. Accordingly, even though the inertia phase starts at different timings depending on the load condition of engine 1, it can be ensured that the torque down operation starts before the inertia phase starts.

Furthermore, according to this embodiment of the present invention, the timing of the torque down start moment t5 varies depending on the gear upshift selection, as shown in FIG. 7. Consequently, regardless of the gear upshift selection, it can be ensured with an even greater certainty that the torque down operation starts before the inertia phase starts.

Consequently, regardless of the engine load condition, the inertia phase will not start while the output torque Te of engine 1 is still in the increased state. Therefore, problems such as occurrence of upshift shock at the beginning of the inertia phase, and the inertia phase not starting until the torque down operation ends can be avoided.

Additionally, before the torque up operation, i.e., before temporarily increasing the output torque Te of engine 1 to reduce the torque retraction shock during the torque phase, the output torque Te of engine 1 is gradually reduced during the period between moments t1 and t2 as shown in FIG. 4.

In other words, the engine torque Te is pre-decreased between the moment t1, at which time the upshift signal is produced, and the moment t2, at which time the torque up operation starts. Consequently, the engine torque Te can be increased during the torque up operation by a greater amount to reduce the torque retraction shock. Therefore, the torque retraction shock can be reduced with an even greater certainty.

Second Embodiment

Figure 8:
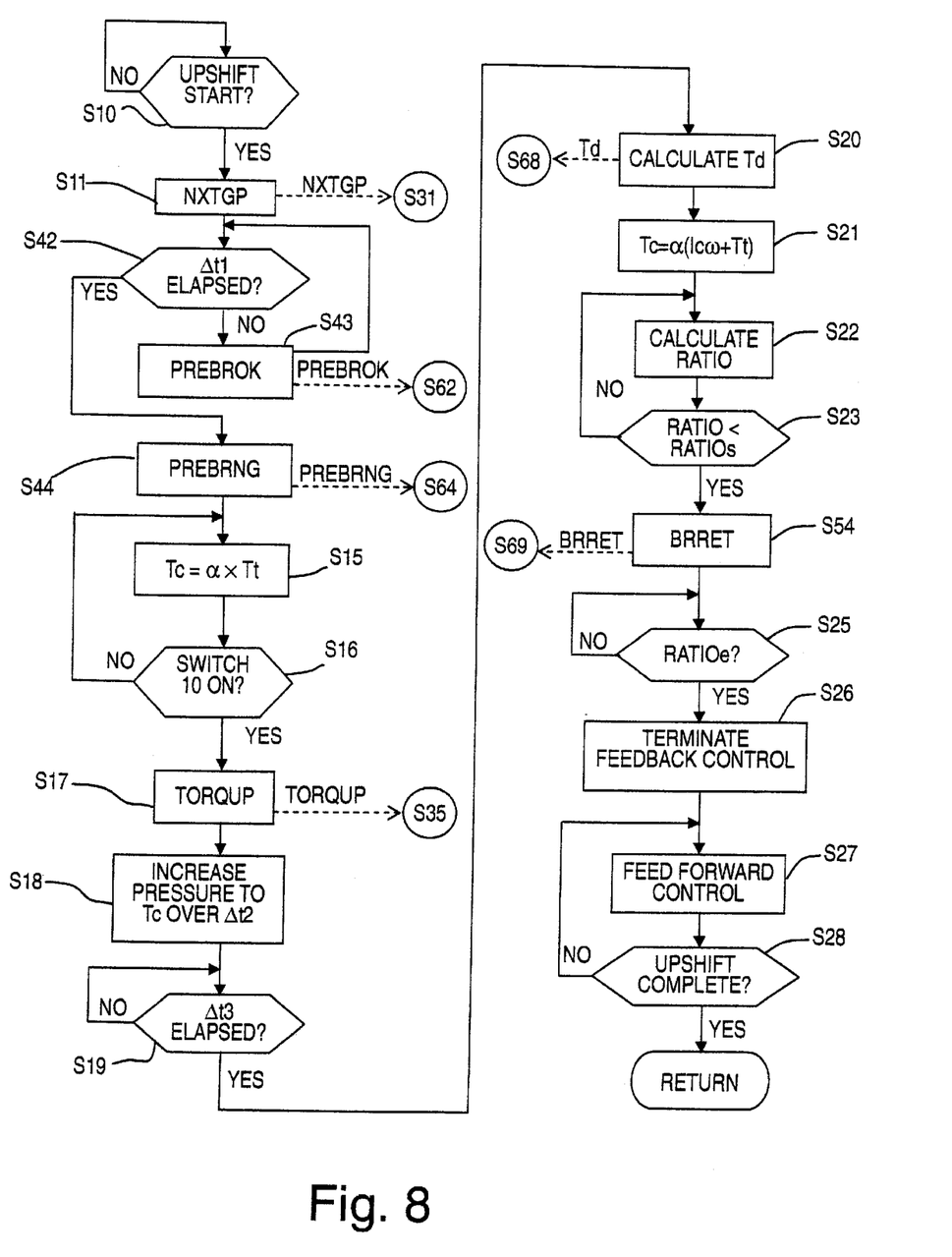
FIG. 8 is a flowchart of automatic transmission control executed by a controller in order to accomplish torque up and torque down operations during the upshift control of the automatic transmission in accordance with a second embodiment of the present invention.
Figure 9:
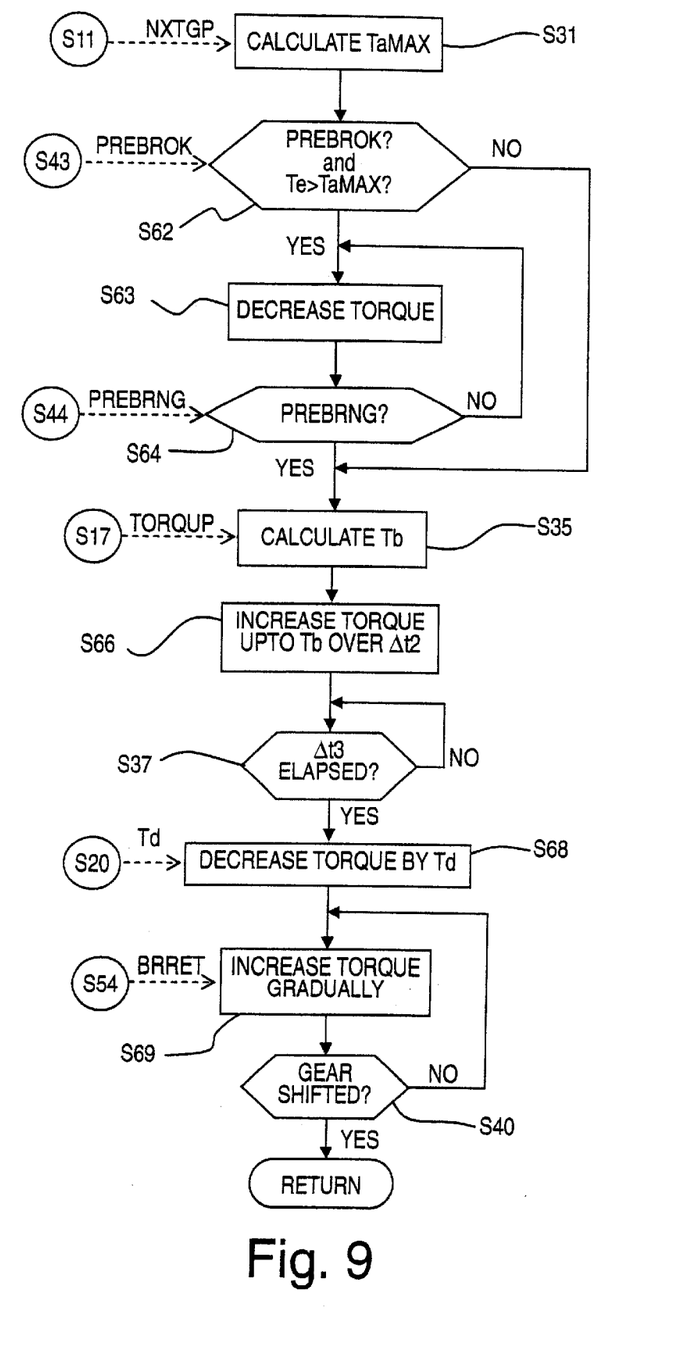
FIG. 9 is a flowchart of a motor/generator control executed by the controller in order to accomplish torque up and torque down operations during the upshift control of the automatic transmission in accordance with the second embodiment of the present invention.

Referring now to FIGS. 8 and 9, a modification of controller 6 of upshift shock reducing apparatus 100 will now be explained.

In the first embodiment discussed above, the torque-up and torque-down operations are respectively accomplished by advancing and delaying the ignition timing of engine 1. In this second embodiment, the torque of the power source is increased and decreased by motor/generator 3 shown in FIG. 1. Specifically, the torque of the power source is increased by operating motor/generator 3 as a motor. Further, the torque of the power source is decreased by operating motor/generator 3 as a regenerative brake.

Referring to FIGS. 8 and 9, the upshift operation of automatic transmission 2 and the torque up and torque down operations of the power source will now be explained. FIGS. 8 and 9 show flowcharts of programs executed by controller 6 during the upshift operation. These flowcharts are substantially equivalent to those of FIGS. 2 and 3 of the first embodiment, except for the method of increasing and decreasing the torque of the power source. Thus, steps shown in FIGS. 8 and 9 that execute the same operations as those in FIGS. 2 and 3 are given the same referential numerals. Further, explanation of these overlapping steps is omitted herein. Steps that are different from those in FIGS. 2 and 3 are given different referential numerals. More specifically, those different steps have numerals that are greater by 30 than the numerals of the corresponding steps in FIGS. 2 and 3.

In the second embodiment, controller 6 controls motor/generator 3 instead of engine 1. The motor/generator control is shown in FIG. 9, while the automatic transmission control is shown in FIG. 8. The automatic transmission control and the motor/generator control of the second embodiment are different from the automatic transmission control and the engine control of the first embodiment only in that in the second embodiment, the torque is increased or decreased by controlling motor/generator 3. Accordingly, steps that relate to control of engine 1 in the first embodiment relate to control of motor/generator 3 in the second embodiment. In this description, only these steps of the second embodiment that are different from the first embodiment will be explained. More specifically, steps S42–S44, and step S54 of the automatic transmission control and steps S62–S64, step S66, steps S68–S69 of the motor/generator control will now be explained as they relate to the second embodiment.

Accordingly, the automatic transmission control starts by controller 6 continuously checking whether an upshift has occurred. Once an upshift occurs, controller 6 executes step S11 in the same manner as the first embodiment. In step S42, controller 6 checks if a pre-shift regenerative braking permission period Δt1 has elapsed since the controller determined in step S11 that the vehicle has started the upshift operation.

The regenerative braking permission period Δt1 is a period during which motor/generator 3 can be operated as a regenerative brake to reduce the torque of the power source, before the torque up operation. In other words, the regenerative braking permission period Δt1 occurs before the torque of the power source is increased by operating motor/generator 3 as a motor. By pre-decreasing the torque, a torque retraction shock during the torque phase of the upshift operation can be prevented. The duration of the regenerative braking permission period Δt1 is determined based on the accelerator pedal depression amount APS and the gear upshift selection. If it is determined in step S42 that the regenerative braking permission period Δt1 has not elapsed, controller 6 proceeds to step S43. Otherwise, controller 6 skips step S43 and proceeds to step S44.

In step S43, during the period between the moment t1, at which time it is determined that the vehicle has started the upshift operation, and the end of regenerative braking permission period Δt1 as shown in FIG. 4, controller 6 produces a pre-shift regenerative braking permission signal PREBROK. The pre-shift regenerative braking permission signal PREBROK is utilized in the control of motor/generator 3 to pre-decrease the torque.

Once it is determined in step S42 that the regenerative braking permission period Δt1 has elapsed, controller 6 proceeds to step 44. The moment of time at which the regenerative braking permission period Δt1 elapses is indicated as "t2" in the timing chart of FIG. 4.

In step S44, controller 6 produces a regenerative braking end signal PREBRNG, which is utilized in the control of motor/generator 3 to stop the predecrease of the torque. Then, controller 6 proceeds to step S15 and operates as mentioned above in the first embodiment until step S54.

Referring now to step S54, controller 6 produces a regenerative braking return start signal BRRET, which is utilized in the control of motor/generator 3 to increase the torque gradually.

Referring to the motor/generator control shown in FIG. 9, in step S62, controller 6 determines if the regenerative braking permission signal PREBROK has been produced in step S43 of the automatic transmission control, and if the engine torque Te exceeds the maximum torque TaMAX, above which torque pre-decrease is required. If these two conditions are satisfied, controller 6 proceeds to step S63. Otherwise, controller 6 skips steps S63 and S64, and proceeds directly to step S65.

In step S63, the torque is gradually reduced by operating motor/generator 3 as a regenerative brake following the moment t1, as indicated in FIG. 4.

In step S64, controller 6 determines whether the regenerative braking end signal PREBRNG has been produced in step S44. In other words, controller 6 determines whether the regenerative braking permission period Δt1 has elapsed, and the moment t2 has occurred as shown in the timing chart of FIG. 4. If controller 6 determines that the regenerative braking end signal PREGRNG has been produced, controller 6 proceeds to step S35. Otherwise, controller 6 returns to step S63 and repeats steps S63–64 until regenerative braking permission period Δt1 elapses.

In step S35, as in the first embodiment, as the torque phase torque up request signal TORQUP is produced in step S17 of the automatic transmission control at the torque phase start moment t3, controller 6 also calculates the power source torque up amount Tb, which is the amount required to cancel the torque retraction of the torque phase. Controller 6 then proceeds to step S66.

In step S66, motor/generator 3 is operated as a motor so that the power source torque increases gradually. As shown in FIG. 4, the power source torque increases at a predetermined rate for the set period Δt2 following the torque phase start moment t3, until the torque reaches the value Tb calculated in step S35. Controller 6 then proceeds to step S37.

In step S37, controller 6 determines whether the torque down start moment t5 has occurred as shown in the timing chart of FIG. 4. The torque down start moment t5 is the moment at which the set period Δt3 ends. The set period Δt3 starts at the moment t4, when the set period Δt2 ends. If the torque down start moment t5 has occurred, controller 6 proceeds to step S68. Otherwise, controller 6 repeats step S37.

In step S68, controller 6 operates motor/generator 3 as a regenerative brake so that the torque decreases by the requested torque down amount Td calculated in step S20 of the automatic transmission control. The torque phase ends at a moment t6 at which time the inertia phase starts as shown in the timing chart of FIG. 4. In this manner, an upshift shock during the inertia phase can be prevented. Then, controller 6 proceeds to step S69.

In step S69, when the regenerative braking return start signal BRRET is produced in step S54 of the automatic transmission control, the regenerative braking force produced by motor/generator 3 is decreased at a prescribed rate per unit time, so that engine torque Te increases gradually to its original state as shown in FIG. 4. Controller proceeds to step S40.

In step S40, controller 6 determines whether the transmission gear ratio has reached the post-shift gear ratio, or whether the power source output torque Te has reached the target torque. If either or both of these criteria is satisfied, controller 6 ends the gradual regenerative braking return control. Also, the engine control ends.

Upshift shock reducing apparatus 100 according to the second embodiment provides the same effects as upshift shock reducing apparatus 100 of the first embodiment. Additionally, in the second embodiment, since the torque of the power source is decreased by regeneratively braking motor/generator 3, the responsiveness of the torque decrease operation does not decrease even when the amount of torque decrease is large. Furthermore, the exhaust gas does not become worsened or the fuel efficiency does not deteriorate even when the torque up and torque down operations are repeated in order to control the engine output.

The terms of degree such as "substantially", "about" and "approximately" as used herein mean a reasonable amount of deviation of the modified term such that the end result is not significantly changed. These terms should be construed as including a deviation of ±5% of the modified term if this would not negate the meaning of the word it modifies.

This application claims priority to Japanese Patent Application No.2000-61621. The entire disclosure of Japanese Patent Application No. 2000-61621 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An upshift shock reducing apparatus for a vehicle having a power train that includes a power source mechanically connected to an automatic transmission having a plurality of shift gears, the upshift shock reducing apparatus comprising:

a power source load sensor that produces a load signal indicative of a power source load of the power source; and a controller operatively coupled to the power source load sensor, the power source, and the automatic transmission, the controller being configured to increase torque of the power source during a torque phase of an upshift operation for a first predetermined period at a predetermined rate, and the controller being configured to decrease the torque of the power source by a first predetermined torque at an end of a second predetermined period, the second predetermined period being determined based on the load signal from the power source load sensor, such that the decrease of the torque starts before an inertia phase of the upshift operation.

2. The upshift shock reducing apparatus as set forth in claim 1, wherein the controller is configured to increase the torque of the power source during the torque phase until the torque reaches a second predetermined torque.

3. The upshift shock reducing apparatus as set forth in claim 1, wherein the second predetermined period starts after the first predetermined period ends.

4. The upshift shock reducing apparatus as set forth in claim 1, wherein the controller is configured to detect a gear upshift selection of the upshift operation, and to further determine the second predetermined period based on the gear upshift selection of the upshift operation.

5. The upshift shock reducing apparatus as set forth in claim 1, wherein the controller is configured to determine the first predetermined period based on the load signal from the power source load sensor.

6. The upshift shock reducing apparatus as set forth in claim 5, wherein the controller is configured to detect a gear upshift selection of the upshift operation, and to determine the first predetermined period further based on the gear upshift selection of the upshift operation.

7. The upshift shock reducing apparatus as set forth in claim 1, wherein the controller is configured to further determine that the vehicle has started the upshift operation, and the controller is configured to further pre-decrease the torque prior to the increasing of the torque if the torque is greater than a third predetermined torque, and if a third predetermined period has not elapsed since the controller determined that the vehicle has started the upshift operation.

8. The upshift shock reducing apparatus as set forth in claim 7, further comprising a vehicle speed sensor that produces a speed signal indicative of a vehicle speed, the controller being configured to detect a gear upshift selection of the upshift operation, the third predetermined torque being determined based on the speed signal from the vehicle speed sensor and the gear upshift selection of the upshift operation.

9. The upshift shock reducing apparatus as set forth in claim 1, wherein the controller is configured to increase and decrease the torque of the power source by advancing and delaying an ignition timing of the power source.

10. The upshift shock reducing apparatus as set forth in claim 1, wherein the controller is configured to increase the torque of the power source by operating a motor/generator as a motor, and to decrease the torque of the power source by operating the motor/generator as a regenerative brake.

11. An upshift shock reducing apparatus for a vehicle having a power train that includes a power source mechanically connected to an automatic transmission having a plurality of shift gears, the upshift shock reducing apparatus comprising:

power source load sensing means for producing a load signal indicative of a power source load;

first period determining means for determining a first predetermined period;

torque increasing means for increasing torque of the power source during a torque phase of an upshift operation for the first predetermined period until the torque reaches a second predetermined torque;

second period determining means for determining a second predetermined period based on the load signal from the power source load sensing means, the second predetermined period starting after the first predetermined period ends; and torque decreasing means for decreasing the torque by a first predetermined torque at an end of the second predetermined period determined by the second period determining means, such that the torque decreasing means starts decreasing the torque before an inertia phase of the upshift operation.

12. The upshift shock reducing apparatus as set forth in claim 11, further comprising detecting means for detecting a gear upshift selection of the upshift operation, the second period determining means determining the second predetermined period further based on the gear upshift operation of the upshift operation.

13. The upshift shock reducing apparatus as set forth in claim 11, wherein the first period determining means determines the first predetermined period based on the load signal from the power source load sensing means.

14. The upshift shock reducing apparatus as set forth in claim 11, further comprising upshift determining means for determining that the vehicle has started an upshift operation before the torque increasing means increases the torque; and pre-decreasing means for pre-decreasing the torque before the torque decreasing means decreases the torque if the torque is greater than a third predetermined torque, and if a third predetermined period has not elapsed since the upshift determining means determined that the vehicle has started the upshift operation.

15. The upshift shock reducing apparatus as set forth in claim 14, further comprising detecting means for detecting a gear upshift selection of the upshift operation;

vehicle speed sensing means for producing a speed signal indicative of a vehicle speed; and third predetermined torque determining means for determining the third predetermined torque based on the speed signal from the vehicle speed sensing means and the gear upshift selection of the upshift operation.

16. The upshift shock reducing apparatus as set forth in claim 11, wherein the torque increasing means increases the torque by advancing an ignition timing of the power source, and the torque decreasing means decreases the torque by delaying the ignition timing of the power source.

17. The upshift shock reducing apparatus as set forth in claim 11, wherein the torque increasing means increases the torque by operating a motor/generator as a motor, and the torque decreasing means decreases the torque by operating the motor/generator as a regenerative brake.

18. A method of reducing upshift shock for a vehicle having a power train that includes a power source mechanically connected to an automatic transmission having a plurality of shift gears, the method comprising:

obtaining a load signal indicative of a power source load of the power source;

determining a first predetermined period;

increasing the torque of the power source during a torque phase of an upshift operation for the first predetermined period until the torque reaches a second predetermined torque;

determining a second predetermined period based on the load signal indicative of the power source load; and decreasing the torque by a first predetermined torque at an end of the second predetermined period, which starts after the first predetermined period ends, such that the decreasing of the torque starts before an inertia phase of the upshift operation.

19. The method of reducing upshift shock for a vehicle as set forth in claim 18, further comprising detecting a gear upshift selection of the upshift operation, the determining of the second predetermined period being further based on the gear upshift selection of the upshift operation.

20. The method of reducing upshift shock for a vehicle as set forth in claim 18, wherein the determining of the first predetermined period is based on the load signal indicative of the power source load.

21. The method of reducing upshift shock for a vehicle as set forth in claim 20, further comprising detecting a gear upshift selection of the upshift operation, the determining of the first predetermined period being further based on the gear upshift selection of the upshift operation.

22. The method of reducing upshift shock for a vehicle as set forth in claim 18, further comprising determining that the vehicle has started an upshift operation prior to the increasing of the torque, and pre-decreasing the torque prior to the increasing of the torque if the torque is greater than a third predetermined torque, and if a third predetermined period has not elapsed since the determining that the vehicle has started the upshift operation.

23. The upshift shock reducing apparatus as set forth in claim 1, wherein the controller is configured to shorten the second predetermined period as the load signal from the power source load sensor becomes a larger value.

24. The upshift shock reducing apparatus as set forth in claim 1, wherein the power source load sensor is an accelerator sensor.

25. The upshift shock reducing apparatus as set forth in claim 11, wherein the second period determining means is configured to shorten the second predetermined period as the load signal from the power source load sensing means becomes a larger value.

26. The upshift shock reducing apparatus as set forth in claim 11, wherein the power source load sensing means is an accelerator sensing means.

27. The method of reducing upshift shock for a vehicle as set forth in claim 18, wherein the second predetermined period sets a shorter time period for the second predetermined period as the load signal from the power source load sensor becomes a larger value.

28. The method of reducing upshift shock for a vehicle as set forth in claim 18, wherein the obtaining the load signal indicative of the power source load is obtained by obtaining a load signal indicative of an accelerator pedal depression amount.

29. An upshift shock reducing apparatus for a vehicle having a power train that includes a power source mechanically connected to an automatic transmission having a plurality of shift gears, the upshift shock reducing apparatus comprising:

a power source load sensor that produces a load signal indicative of a power source load of the power source; and a controller operatively coupled to the power source load sensor, the power source, and the automatic transmission, the controller being configured to increase the torque of the power source during the torque phase, decrease the torque of the power source during a predetermined period after a predetermined time has elapsed since the beginning of the increase of the torque during the torque phase, set the predetermined period to start before an inertia phase, and change the predetermined period according to the load signal from the power source load sensor.

30. The upshift shock reducing apparatus as set forth in claim 29, wherein the controller is configured to shorten the predetermined period as the load signal from the power source load sensor becomes a larger value.

31. The upshift shock reducing apparatus as set forth in claim 29, wherein the power source load sensor is an accelerator sensor.

* * * * *